UNITED STATES PATENT OFFICE.

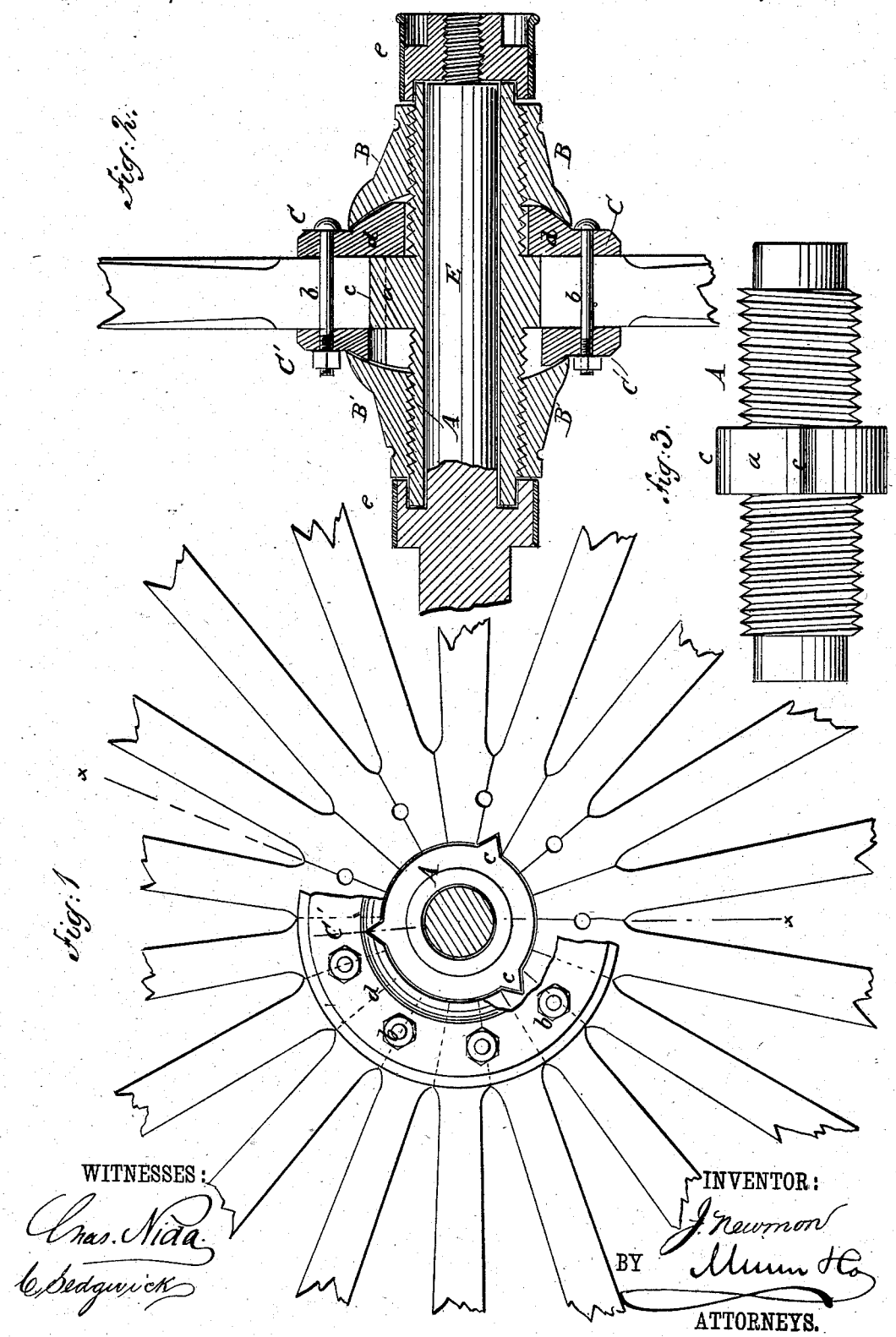

JAMES NEWMON, OF WHITE OAK, ALABAMA.

HUB FOR VEHICLE-WHEELS.

SPECIFICATION forming part of Letters Patent No. 255,008, dated March 14, 1882.

Application filed December 13, 1881. (No model.)

*To all whom it may concern:*

Be it known that I, JAMES NEWMON, of White Oak, in the county of Barbour and State of Alabama, have invented a new and useful Improvement in Vehicle-Wheels, of which the following is a full, clear, and exact description.

The objects of my invention are to furnish wheels superior in the respects of durability, strength, and facility of manufacture and repairs; to which end my invention consists in the wheel constructed as hereinafter described and claimed.

Reference is to be had to the accompanying drawings, forming a part of this specification, in which similar letters of reference indicate corresponding parts in all the figures.

Figure 1 is a side view, partly sectional, of a wheel of the improved construction. Fig. 2 is a cross-section of the hub on line $x\,x$ of Fig. 1, and Fig. 3 is a side elevation of the tube or box.

A is a tube, forming the box of the hub and carrying the devices for clamping the spokes, as next described. The tube A is formed at its mid-length with an annular shoulder, $a$, and is screw-threaded externally from the shoulder to near each end.

B B' are nuts of tapering form, having their inner ends concaved or recessed. C C' are rings having openings of unequal size, and bolted to the spokes, the opening of ring C' being of a size for passing over the tube and its shoulder, while the opening of the ring C is only large enough for passing over the tube and abuts against the shoulder $a$.

The rings C C' are formed with beveled annular projections $d$ on their outer surfaces, over which the recessed ends of nuts B B' lap, so that the nuts shall act to retain the rings centrally and bind them firmly.

The rings are held to the spokes at opposite sides by bolts $b$ passing through between the spokes from side to side, and to prevent the rings and spokes from turning on the tube the shoulder $a$ is formed with spurs $c$ at suitable intervals, that enter the ends of the abutting spokes.

The hub is shown on a spindle, E, on which are dust and point caps $e$, taking over the ends of tube A.

To construct the wheel, the spokes are placed between the rings C C', the bolts $b$ then inserted, and the nuts put on to clamp the rings to the spokes. The tube A, with the inner nut, B', upon it, is then put through the rings from the inner side, and the outer nut, B, put on and screwed up. The rings and spokes are thus clamped firmly, and a solid hub thus formed. To renew one or more of the spokes, the outer nut and the ring C are to be removed, which leaves the spokes exposed.

The wheel constructed as described has many advantages, as follows: The rings bind equally on the spokes and hold them firmly in position according to the angle of the tenon portion, so that the wheel is not liable to become dished or sprung. The tire can be put on more tightly without risk of dishing the wheel, and in case of shrinkage the parts can be readily tightened. There being no wooden portions that cannot be readily renewed, the wheel is durable and does not become weakened by use. The spindles can be used shorter and of larger diameter, thus obtaining greater strength and reducing friction.

Having thus described my invention, I claim as new and desire to secure by Letters Patent—

1. A vehicle-wheel having its hub formed of the threaded tube A, provided with the annular flange $a$, the tapering nuts B B', having concave inner ends, and the ring-plates C C', provided with beveled annular projections $d$, and clamped to the spokes by bolts $b$, substantially as shown and described.

2. In vehicle-wheels, the combination, with the threaded tube A, provided with the annular flange $a$, of the nuts B B', having concave inner ends, and the ring-plates C C', having unequal openings and provided with beveled projections $d$, substantially as and for the purpose set forth.

3. In vehicle-wheels, the externally-threaded tube A, provided with the central annular flange, $a$, having spurs $c$, substantially as and for the purpose set forth.

JAMES × NEWMON.
his mark.

Witnesses:
R. M. LASETER,
J. E. TUCKER.